(12) United States Patent
Lynch et al.

(10) Patent No.: US 12,229,150 B2
(45) Date of Patent: *Feb. 18, 2025

(54) INTELLIGENT COMPUTE REQUEST SCORING AND ROUTING

(71) Applicant: Palantir Technologies Inc., Palo Alto, CA (US)

(72) Inventors: Matthew Lynch, Brooklyn, NY (US); Brandon Krieger, New York, NY (US); Giulio Mecocci, Brooklyn, NY (US); Kyle Patron, Philadelphia, PA (US); Kevin Pyc, New York, NY (US); Sander Kromwijk, New York, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/793,881

(22) Filed: Feb. 18, 2020

(65) Prior Publication Data

US 2020/0183945 A1  Jun. 11, 2020

Related U.S. Application Data

(63) Continuation of application No. 16/175,371, filed on Oct. 30, 2018, now Pat. No. 10,606,851.
(Continued)

(51) Int. Cl.
*G06F 16/2457* (2019.01)
*G06F 9/50* (2006.01)

(52) U.S. Cl.
CPC ...... *G06F 16/24578* (2019.01); *G06F 9/5027* (2013.01)

(58) Field of Classification Search
CPC ........... G06F 16/2455; G06F 16/24549; G06F 16/24553; G06F 16/24578; G06F 9/5027;
(Continued)

(56) References Cited

U.S. PATENT DOCUMENTS 5,515,488 A  5/1996  Hoppe et al.
6,006,225 A  12/1999  Bowman et al.
(Continued)

FOREIGN PATENT DOCUMENTS

EP  2608070  6/2013
EP  3620934  3/2020
(Continued)

OTHER PUBLICATIONS

Official Communication for European Patent Application No. 19196317.2 dated Feb. 17, 2020, 13 pages.
(Continued)

*Primary Examiner* — Augustine K. Obisesan
(74) *Attorney, Agent, or Firm* — Knobbe, Martens, Olson & Bear, LLP

(57) ABSTRACT

A system and methods for determining computer resource allocation, the system having a network communication interface configured to receive a query from a device, the query indicating a request to perform a processing operation on a portion of one or more data set. The system may also include data storage for data including historical information related to processing of data sets by back-end computer resources, and hardware processors configured to determine one or more scores associated with a query and based at least in part on the historical information. The system may determine a particular back-end computer resource with a highest score, provide a compute request to the particular back-end computer resource to perform a processing operation on a portion of one or more data sets, and store
(Continued)

processing information related to the processing of the compute request by the particular back-end computer resource as historical information.

21 Claims, 10 Drawing Sheets

Related U.S. Application Data

(60) Provisional application No. 62/729,204, filed on Sep. 10, 2018.
(58) Field of Classification Search
CPC ........ G06F 9/5044; G06F 9/50; G06F 9/5088; G06F 9/5016; G06F 11/3433; G06F 9/5011
See application file for complete search history.

(56) References Cited

U.S. PATENT DOCUMENTS

| | | | |
|---|---|---|---|
| 6,789,074 B1* | 9/2004 | Hara | G06F 16/24547 |
| 8,972,337 B1 | 3/2015 | Gupta | |
| 9,686,086 B1 | 6/2017 | Nguyen et al. | |
| 10,057,373 B1 | 8/2018 | Chang | |
| 10,606,851 B1 | 3/2020 | Lynch et al. | |
| 10,754,701 B1* | 8/2020 | Wagner | G06F 9/5077 |
| 10,831,549 B1* | 11/2020 | Radhakrishnan | G06F 9/5044 |
| 2004/0186826 A1 | 9/2004 | Choi et al. | |
| 2005/0192937 A1* | 9/2005 | Barsness | G06F 16/24542 |
| 2005/0262050 A1 | 11/2005 | Fagin et al. | |
| 2006/0026116 A1 | 2/2006 | Day et al. | |
| 2006/0041544 A1* | 2/2006 | Santosuosso | G06F 16/245 |
| 2008/0201748 A1 | 8/2008 | Hasek et al. | |
| 2009/0007101 A1 | 1/2009 | Azar et al. | |
| 2009/0112799 A1* | 4/2009 | Barsness | G06F 16/2453 |
| | | | 707/999.102 |
| 2011/0219020 A1 | 9/2011 | Oks et al. | |
| 2012/0023120 A1 | 1/2012 | Kanefsky | |
| 2012/0084316 A1 | 4/2012 | Koenig et al. | |
| 2012/0198462 A1 | 8/2012 | Cham et al. | |
| 2012/0278339 A1 | 11/2012 | Wang | |
| 2013/0024484 A1 | 1/2013 | Banerjee et al. | |
| 2013/0067581 A1* | 3/2013 | Venketeshwar | G06F 21/577 |
| | | | 726/25 |
| 2013/0275381 A1 | 10/2013 | De Schrijvr et al. | |
| 2014/0053091 A1 | 2/2014 | Hou et al. | |
| 2014/0059062 A1* | 2/2014 | Ahn | G06F 16/245 |
| | | | 707/756 |
| 2014/0082647 A1 | 3/2014 | Verrilli et al. | |
| 2014/0090081 A1 | 3/2014 | Mattsson et al. | |
| 2014/0280056 A1 | 9/2014 | Kelly | |
| 2014/0282160 A1 | 9/2014 | Zarpas | |
| 2014/0282163 A1 | 9/2014 | MacKinlay et al. | |
| 2015/0234898 A1 | 8/2015 | Choi et al. | |
| 2015/0324371 A1 | 11/2015 | Guo | |
| 2016/0021117 A1 | 1/2016 | Harmon et al. | |
| 2016/0029248 A1 | 1/2016 | Syed et al. | |
| 2016/0034214 A1 | 2/2016 | Kamp et al. | |
| 2016/0041984 A1 | 2/2016 | Kaneda et al. | |
| 2016/0042009 A1* | 2/2016 | Gkoulalas-Divanis | |
| | | | G06F 21/6218 |
| | | | 707/783 |
| 2016/0092510 A1 | 3/2016 | Samantaray et al. | |
| 2016/0119209 A1 | 4/2016 | Rosengarten | |
| 2016/0134723 A1 | 5/2016 | Gupta et al. | |
| 2016/0171235 A1* | 6/2016 | Konik | G06F 21/6227 |
| | | | 707/784 |
| 2016/0171236 A1 | 6/2016 | Konik et al. | |
| 2016/0259939 A1* | 9/2016 | Bobritsky | G06F 16/245 |
| 2017/0111445 A1* | 4/2017 | Kunde | H04L 67/1008 |
| 2017/0206372 A1 | 7/2017 | Jung | |
| 2017/0220703 A1 | 8/2017 | Martha | |
| 2017/0262196 A1 | 9/2017 | Hirose | |
| 2017/0270189 A1* | 9/2017 | Kaneda | G06F 16/9535 |
| 2017/0337209 A1 | 11/2017 | Schaet et al. | |
| 2018/0039399 A1 | 2/2018 | Kaltegaertner et al. | |
| 2018/0121426 A1 | 5/2018 | Barsness et al. | |
| 2018/0300174 A1 | 10/2018 | Karanasos et al. | |
| 2018/0343321 A1 | 11/2018 | Chang | |
| 2018/0349431 A1* | 12/2018 | Garcia Tellez | G06F 16/23 |
| 2020/0042647 A1* | 2/2020 | Pandey | G06N 20/20 |
| 2023/0315519 A1 | 10/2023 | Krieger et al. | |

FOREIGN PATENT DOCUMENTS

| | | |
|---|---|---|
| EP | 4198764 | 6/2023 |
| EP | 4254186 | 10/2023 |
| KR | 10-1512647 | 4/2015 |
| TW | 200939043 | 9/2009 |

OTHER PUBLICATIONS

Howe et al., "SAVVYSEARCH—A Metasearch Engine That Learns Which Search Engines to Query", AI Magazine, American Association for Artificial Intelligence, vol. 18, No. 2, Jul. 21, 1997, 8 pages.
Wikipedia, "User-defined function", Jan. 21, 2018, retrieved from the Internet: http://en.wikipedia.org/w/index.php?title=User-defined_function&oldid=821540195 on Feb. 4, 2020, 4 pages.
Official Communication for European Patent Application No. 19196317.2 dated Feb. 8, 2021, 6 pages.
Decision to Refuse a European Patent Application for European Patent Application No. 19196317.2 dated Dec. 5, 2022, 20 pages.
Official Communication for European Patent Application No. 19196317.2 dated Jan. 21, 2022, 11 pages.
Official Communication for European Patent Application No. 23156695.1 dated Mar. 6, 2023, 14 pages.
Official Communication for European Patent Application No. 23165009.4 dated Jun. 30, 2023, 12 pages.
Afify Ghada M et al: "A hybrid filtering approach for storage optimization in main-memory cloud|database", Egyptian Informatics Journal, Elsevier, Amsterdam, NL, vol. 16, No. 3, Aug. 21, 2015 (Aug. 21, 2015), pp. 329-337, XP029356693, ISSN: 1110-8665.
Brooks et al., "Hoptrees: Branching History Navigation for Hierarchies," Sep. 2, 2013, Network and Parallel Computing, pp. 316-333.
Ravishankar Ramamurthy et al: "A Case for Fractured Mirrors", Proceedings of the Twenty-Seventh International Conference On Very Large Data Bases, Roma, Sep. 11-14, Morgan Kaufman, Orlando, FLA, Jan. 1, 2002 (Jan. 1, 2002), ISBN: 978-1-55860-804-7.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
Zaharia et al., "Resilient Distributed Datasets: A Fault-Tolerant Abstractions for In-Memory Cluster Computing," Proceedings of the 9th USENIX Conference on Networked Systems and Design and Implementation, 2012, 14 pages.
Official Communication for European Patent Application No. 19196317.2 dated Nov. 14, 2019, 15 pages.

* cited by examiner

| Query ID | COMPUTE REQUEST ID | ORIGINATOR | GROUP | REQUEST TYPE | DATA SET SIZE (#ROW, #COLUMNS, SIZE) | BACK-END COMPUTE RESOURCE PARAMETERS | | | | |
|---|---|---|---|---|---|---|---|---|---|---|
| | | | | | | MEMORY | # CPU'S | PRIORITY | CPU TYPE | OTHER PARAMETERS 1, 2, ..., N |
| | | | | | | | | | | |
| | | | | | | | | | | |
| | | | | | | | | | | |
| | | | | | | | | | | |
| | | | | | | | | | | |
| | | | | | | | | | | |

FIG. 3

INTELLIGENT COMPUTE REQUEST SCORING AND ROUTING

REFERENCE TO PRIORITY APPLICATIONS

This application is a continuation application of U.S. patent application Ser. No. 16/175,371, filed Oct. 30, 2018, and titled "INTELLIGENT COMPUTE REQUEST SCORING AND ROUTING" which claims the benefit of U.S. Provisional Application No. 62/729,204, filed on Sep. 10, 2018, titled "INTELLIGENT COMPUTE REQUEST SCORING AND ROUTING." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for performing compute requests on a number of resources. More specifically, this disclosure relates to techniques for scoring compute requests and routing the compute requests to one of a number of possible computing resources based at least in part on the scoring.

BACKGROUND

Large scale, multicomputer datacenters host large quantities of data. In response to user queries to manipulate the large quantities of data, the datacenter may distribute a "compute request" to one of a number of compute resources, the compute request a communication from the datacenter for a particular compute resource to perform processing data as stipulated in a user query. Multi-computer data centers rely on load balancers to route queries and distribute load across available computer resources. Generic load balancers lack domain knowledge about queries and cannot effectively interpret them to identify similarity, which results in not taking full advantage of caching functionality.

Depending on the complexity of a query, or the size of the one or more data sets, the amount of processing involved can vary significantly. Also, certain compute requests may contain user defined code, which may introduce risks when performing the compute request. In addition, historical information associated with prior executions of compute requests may not be collected or considered for routing compute requests. Accordingly, back-end computational environments can be inefficient, requiring more resources than necessary for performing queries on large data sets, and may not be effectively mitigating known risks.

SUMMARY

To address these and other issues, embodiments of systems and methods of a server system configured to dispatch compute request to appropriate computer resources to increase efficiency and lower risk during processing are disclosed herein. Some embodiments include for example, a server system having a software architecture for intelligently dispatching compute requests to appropriate back-end compute resources. Queries, for computational tasks on one or more data sets, may be received from a number of front-end computer resources by the system over a network. The system receives and processes the queries through a "routing pipeline"—for each query, it may assign a score to each compute resource based on how well it estimates the compute resource will be effective in executing the query. Such estimates may be based on the analysis of the query itself, as well as historical data. The system then tries to provide a compute request to the compute resources, starting from the one that was attributed the highest score.

The routing pipeline may include a pluggable framework for defining scoring/filtering strategies. Scoring/filtering may be based on one or more of, for example, originator (e.g., user group) of the query, the source (e.g. the front-end resources that submitted the query), health of back-end compute resources, inclusion of user defined code in the query, the existence of usable cached data (previously computed data), availability of relevant datasets in the resource's caches, historical information of previously run processing tasks, and/or source user/request characteristics, etc.

In certain embodiments, the system may include a query "trimming" service whereby portions of a query are trimmed and replaced with precomputed and materialized data, such as the output of the compute request that was previously executed by one or more of the compute resources. Also, in some embodiments, the system may be configured to control the lifecycle (i.e. starting, stopping) of the back-end compute resources in a way that guarantees the high-availability of such resources, that is, to minimize or eliminate downtime and the impact of failures. In some embodiments, the system may be configured to monitor and manage the lifecycle of back-end resources to ensure compute resources are healthy and if not stop or remove them, auto-scale up/down the number of compute resources available (e.g., based on utilization), and/or store historical metadata for queries (e.g., run times, query source).

Accordingly, one innovation includes a system comprising a resource allocation system, including a network communication interface configured to receive a query from a device, the query indicating a request to perform a processing operation on a portion of one or more data sets, a first non-transitory computer storage medium configured to store data generated by two or more back-end computer resources, the data including historical information related to processing of previously received queries, a second non-transitory computer storage medium configured to at least store computer-executable instructions, and one or more computer hardware processors in communication with the second non-transitory computer storage medium. The one or more computer hardware processors configured to execute the computer-executable instructions to at least: determine one or more scores associated with the query, the one or more scores indicating a particular back-end computer resource, of the two or more back-end resources, provide a compute request to the particular back-end computer resource to perform a processing operation on a portion of one or more data sets, and store processing information related to the processing of the compute request by the particular back-end computer resource as historical information in the first non-transitory computer storage medium.

Embodiments of such systems may have one or more additional features. For example, in some embodiments, the particular back-end computer resource is indicated by a determined high score associated with the query. In some embodiments, at least one of the scores is based at least in part on the originator of the query. In some embodiments, the originator is associated with a predefined group of a number of groups that the query maybe associated with. In some embodiments, at least one of the scores is based at least in part on whether the query includes user defined code. In some embodiments, at least one of the scores is based at least in part on the type or characteristic of the query. In some embodiments, at least one of the scores is based at least in part on stored historical information. In some embodiments, the one or more computer hardware processors are further configured to execute the computer-executable instructions to at least receive processing information from two or more back-end computer resources and save the processing information in the first non-transitory computer storage medium as historical data. In some embodiments, the historical data includes processing time. In some embodiments, the historical data includes characteristics of the computer resource.

Embodiments of such systems may have further one or more additional features. For example, in some embodiments, the historical data includes query originator data. In some embodiments, the historical data includes data set information corresponding to a particular data set processed by a back-end computer resource, the data set information at least one of the more of number of rows of the data set, the number of columns of the data set, or the overall size of the data set. In some embodiments, the one or more computer hardware processors are further configured to execute the computer-executable instructions to control a lifecycle parameter of the back-end computer resources. In some embodiments, controlling a lifecycle parameter comprises setting stop and start parameters of a back-end computer resource. In some embodiments, controlling a lifecycle parameter comprises controlling start of back-end computer resources with similar compute parameters. In some embodiments, controlling a lifecycle parameter comprises controlling start of back-end computer resources having non-similar compute parameters. In some embodiments, the one or more computer hardware processors are further configured to execute the computer-executable instructions to start a particular back-end computer resource for a query with user defined code and stop the particular back-end computer resource when the compute request is completed.

Another innovation includes a method of resource allocation, comprising receiving processing information related to processing of compute requests from two or more back-end computer resources, storing the processing information on a non-transitory computer storage medium as historical information, receiving a query indicating a request to perform a processing operation on one or more data sets, determining one or more scores associated with the query, the one or more scores indicating a particular back-end computer resource, of the two or more back-end resources. The one or more scores may be determined at least in part from stored historical information. The method may further include providing a compute request to the particular back-end computer resource to perform a processing operation on a portion of one or more data sets, where the method is performed by one or more computer hardware processors configured to execute computer-executable instructions stored on a non-transitory computer storage medium.

Embodiments of such method may have further one or more additional features. For example, in some embodiments, the method further comprises starting a first back-end computer resource for a query with user defined code, and stopping the first back-end computer resource when the compute request is completed. In some embodiments, the method further comprises determining the query includes user defined code, determining a stop parameter based on the user defined code, starting a first back-end computer resource, providing a compute request to the first backend computer resource, and stopping the first backend computer resource based on a parameter.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 3 illustrates an example of historical information that may be stored in a resource allocation system.

DETAILED DESCRIPTION

Overview

Figure 1:
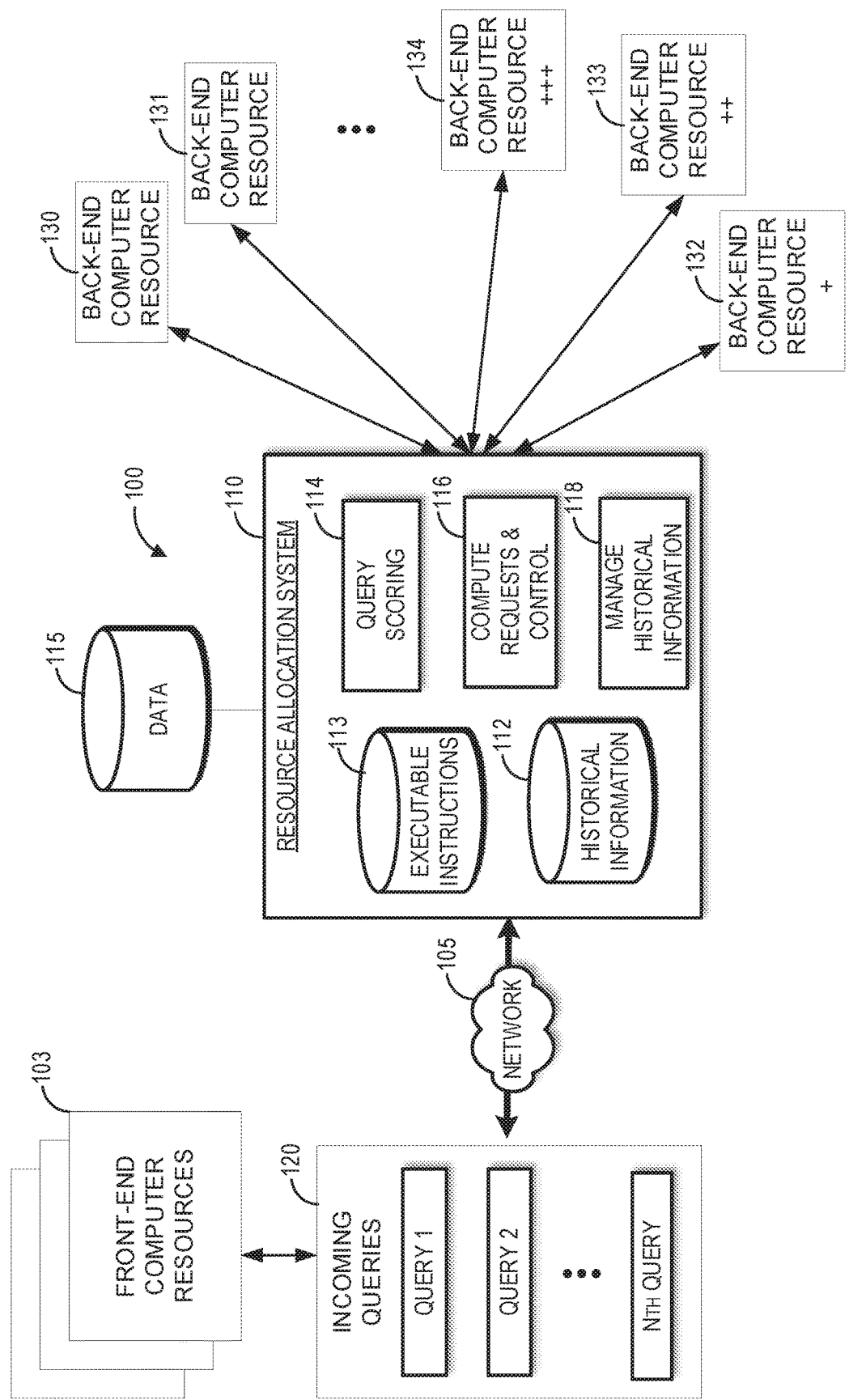
FIG. 1 illustrates a schematic of an overview of an embodiment of a resource allocation system for determining one or more scores associated with a query based at least in part on stored historical information, providing a compute request to the particular back and computer resource to perform a processing operation on a portion of one or more data sets, and storing processing information related to the processing of the compute request as historical information.

Data analysts working on large and complex data sets may want to perform many different types of processing on the data sets, for example, computations, filtering, searching, data transformations, search and replacement of information, etc. Some data sets are extremely large, having dozens or hundreds of columns, and millions or hundreds of millions (or more) of rows of data, while other data set may be significantly smaller. In one example, large data sets are preprocessed to correct values of data fields, manipulate or change values of data fields, remove or add data fields, row, or columns, and/or manipulate rows and columns to serve future use of the data, for example analysis, joining, visualization, or presentation. In another example, two or more large data sets that are being used for analysis task may be conceptually structured according to an object centric data model represented by an ontology, and may include one or more fields that are linked by the ontology. Depending on the particular data sets being used, objects within a data set may have multiple links to other objects. Objects within a data set may also have links to objects in another data set. For example, a data source being analyzed may have two or more linked object sets, or to other data sets that include at least one common field to the data source. Accordingly, computations, filtering, searching, data transformations, search and replacement tasks etc. may become many times more complicated require more computational resources than processing a stand-alone non-linked data set. Accordingly, some processing tasks that a data analyst may want to perform on various data sets may be vastly different and are best performed using different computer resources (e.g., differently configured computer resources) due to their complexity and the size of the data set being processed.

In an example of a data analyst workflow, processing tasks to be performed on a large dataset may be defined as part of a processing task definition step on a front-end computer system, and a query is generated that includes information indicting the processing tasks and of the one or more data sets to be processed. The query is routed from the front-end computer over a network to a resource allocation system, and then a compute request is sent to a back-end computer resource to perform the processing task as defined by information in the query. Once the processing is completed by the back-end computer resource, the resulting data (e.g., a linked reference to the resulting data) may be provided back to the data analyst who generated the query, or the resulting data may be stored for future processing and the data analysts is informed where the resulting data is stored.

To facilitate a datacenter efficiently performing the wide variety of data processing tasks that may be needed (e.g., using the appropriate amount of backend computer resources), disclosed herein are embodiments of resource allocation server systems and methods relating to a resource allocation server system configured to receive queries from front-end computer systems, determine a back-end computer resources to perform the processing indicated in the queries, and dispatch compute requests (corresponding to each of the received queries) to appropriately configured (or sized) back-end computer resources to perform the processing task.

Some embodiments of the resource allocation server system include a server system having a software architecture for intelligently dispatching compute requests to appropriately configured back-end compute resources. The system may receive and processes queries through a process referred to here as a "scoring pipeline" to determine one or more scores associated with the information in each query. The system then provides a compute request to a particular back-end computer resource based on the one or more query scores. The back-end computer resource that receives the compute request may be one of a number of possible back-end compute resources that exist at the time the query is received, or that is instantiated to perform the compute request. Accordingly, back-end computer resource can be, in various embodiments, may include one or more of a hardware system (e.g., one or more of a particular computer, processor, or a server system), and/or a software instantiated processing system (e.g., an instantiated virtual computing environment having certain parameters, for example, a certain memory allocation).

Processing Information

The resource allocation system may also be configured to receive processing metadata from the back-end resource after the compute request has been performed, and store the processing metadata as historical metadata. For example, the processing metadata may include metrics indicating how long the processing took to run (e.g., CPU run time), how many computations were performed, and how much memory was used during processing. The processing metadata may also include information relating to the one or more data sets being processed, including the size of each of the data sets processed for the query (e.g., overall size, # rows, # columns, or other metrics that characterize the size or structure of the one or more data sets, for example, relational links), the number of data sets processed, and how the data in the data sets is organized, etc. The processing metadata may also include information relating to the computer resource that was used to process the compute request. For example, the number of CPU's in the computer resource, the speed of the CPU's, the amount of cache of the CPU's, or the amount of memory allocated or physically for the computer resource, as well as other back-end computer resource information.

Routing Pipeline

The routing pipeline may include a pluggable framework for defining scoring/routing strategies. Scoring may be based on information that is in the query ("query information"), for example, one or more of originators of the query (e.g., a data analyst group), the scope of the processing task (e.g., the type of processing being performed, the size of the one or more datasets being processed), or the inclusion of user defined code in the query. Scoring may also be based on one or more of the health or operability of back-end compute resources (e.g., the availability of certain hardware or software resources), the existence of usable cached data (previously computed data), availability of relevant datasets, historical compute runtimes using particular compute resources for particular compute requests, source user/request characteristics, etc.

Originator

In some embodiments, a certain originator of a query may often generate queries for complex processing on very large datasets which require millions or billions of computations. Accordingly, the originator can be added to a user group of power-users (or large resource users). In some embodiments, when the query information indicates such an originator, the scoring pipeline can generate higher scores for more powerful compute resources, so that queries from this originator are sent to such powerful back-end compute resources to perform the processing. In other embodiments, the scoring pipeline may also adjust such scores based on other query information. In some embodiments, when the scoring pipeline identifies a particular originator or group in the query data, a predetermined back-end computer resource is identified (e.g., either real or virtual) to perform the compute request.

Scope of Processing

In some embodiments, the scope of processing that is being requested by the query may be considered when determining a back-end computer resource to perform the processing. For example, when the query information indicates a larger number of data sets, larger sized data sets, and data sets with larger numbers of rows and/or columns, the routing pipeline might produce a higher score for more powerful compute resources. Also, the query information may include indications of the type(s) of processing being performed. When the type of processing indicates more complex operations to be performed, the routing pipeline will generate higher scores for more powerful compute resources, indicating that they should be used for the processing of the query.

Inclusion of User Defined Code

Some queries may include user defined code to be run by the back-end compute resource to perform a processing task on one or more data sets. For example, a data analyst may include some custom designed code for performing a certain transformation on a data set, where such a transformation is not a selectable option on a user interface. Running user defined code incurs a risk because, for example, it has not been tested and may include one or more bugs (e.g., a divide by zero operation, an incomplete processing flow, a clerical error, or the like). In some embodiments, the routing pipeline may be configured to determine if user defined code exists in the query, and if it does, filter out any compute resources that are not configured to run user defined code, so that the query cannot be dispatched to them. Subsequently, when a backend computer resource is identified for the query containing user defined code, the resource allocation system may define one or more parameters to control the compute resource that receives the compute request for such a query. The parameters may include run-time limits for the computer resource. For example, a parameter may limit the amount of memory that may be used. In another example, a parameter may limit the amount of time the compute resource is allowed to run. In another example, a parameter may indicate that a compute resource should be terminated as soon as it has completed the compute request.

Availability of Resources

In some embodiments, a routing pipeline may attribute a score to the compute resources based on the priority of the processing task described in the query and the health or operability of the compute resources (e.g., the availability of certain hardware or software resources). For example, the routing pipeline may evaluate the query information and also have knowledge of the operability of back-end computer resources, such that back-end resources that are operable (or have a higher degree of operability) are attributed higher scores, which will indicate that the query will be routed to them.

Usable Cached Data

In some embodiments, previously performed processing for particular data sets is stored (cached) and may be used to satisfy subsequent queries, instead of performing the same processing again thus possibly saving on computing resources. For example, a data set may often be used by a certain data analyst, or several data analysts, as a starting point for certain processing that is common for the certain analyst(s). Data resulting from a compute request relating to certain common processing on a certain common data set can be stored as a computed data set and indexed. When the resource allocation system determines that the query defines processing that is equivalent to the processing that resulted in the stored computed data set, it can generate avoid computation altogether and simply returned the stored computed data. That is, rather than perform the same processing again, the resource allocation system identifies that the processing was previously done (e.g., by checking an index of precomputed data sets) and then provides the computed data set back in response to the query (along with any other data that was generated as a result of the query). For example, a license data set may include information relating to all of the licensed automobile drivers in the United States. Data analysts that work on the licensed data set may typically filter the license data set to generate a Western States license data set that include only drivers in Washington, Oregon, Arizona, Nevada, Utah, New Mexico, Idaho, Wyoming, Montana, Colorado, and California. The Western States license data set maybe stored and indexed in the resource allocation system. Subsequently, if a query is received that indicates to filter the license data set to produce a Western States license data set, the resource allocation system can determine that this data set is stored, and provide the stored Western States license data set in response to the query, obviating the need to again produce the same data set and thus saving computer resources for other tasks. This functionality may be generalized and characterized as a trimming service, where portions of a query are trimmed and replaced with precomputed data by the resource allocation system.

Scoring Example

Table 1 (below) illustrates examples of how the routing pipeline may analyze a query to generate features that will be used when scoring the compute resources based on their fitness to execute the query. The "Attribute" column of Table 1 indicates information that may be found in a query, according to some embodiments. For example, the query may include information indicating whether the data set, or the data sets, that will be processed for the query are either small, medium or large data sets. In some embodiments, the determination of the data set size is based on the total size of all data sets involved in the processing. In some embodiments, a data set size may be included for each data set being processed. In some embodiments, the data set being processed is indicated in the query information in the resource allocation system determines the size of the data set. In the example shown in Table 1, a score may be determined for the size of the data set (or data sets) being processed. For example, if the data set being processed is a small data set, the size feature can be given value SIZE 1, a medium data set can be given value SIZE 2, a large data set can be given value SIZE 3. Another feature is extracted based on the number of data sets that are to be processed. For example, if one data set is being processed, the data sets number feature can be given value NUM 1, if 2 data sets are being processed it can be given value NUM 2, etc. Also, in this example, the query can be classified based on a particular user group (e.g., of analysts) that generated the query, resulting in a user group feature that can take values of GROUP 1-N. Also, in this example, the query may be classified based on the originator (e.g., analyst) of the query resulting in an origin feature that can take values of ORIG 1-N. In some embodiments, the query includes the type of processing task, and correspondingly a feature may be extracted for the type of processing that will be performed (e.g., filtering, joining) and can take values of TYPE 1-N. In some embodiments, queries that include user defined code may also be classified based on whether they do contain code, in which case the UDC feature will have value UDC YES, or not, in which case the feature will have value UDC NO. In some embodiments, a priority of the processing may also be included in the query, and correspondingly a priority feature will be extracted, which can take values PRI 1-N where the higher the number, the higher the priority. In some embodiments, if cached data is available to substitute for portion of the processing, a feature may be correspondingly extracted as either CACHE YES or CACHE no. As one of ordinary skill in the art will appreciate, in other examples, a query may include other types of information (attributes), from which features may be extracted and then used to calculate the score for the compute resources that can process the queries, so that the optimal compute resource can be selected. The compute resource scores can be defined by one or more of any of the features listed in Table 1, or any feature for a query that are based on information in the query. For example, in some implementations, scores may be derived from a combination (sum, average, weighted combination, etc.) of multiple of the features noted below and/or other features.

TABLE 1

| Attribute | Score |
| --- | --- |
| Small data set | SIZE 1 |
| Medium data set | SIZE 2 |
| Large data set | SIZE 3 |
| # datasets - 1 data set | NUM 1 |
| # datasets - 2 data sets | NUM 2 |
| # datasets - 3 data sets | NUM 3 |
| # datasets - 4+ data sets | NUMBER |
| Group | GROUP 1-N |
| Originator | ORIG 1-N |
| Type of task | TYPE 1-N |
| User defined code | UDC YES/NO |
| Priority of task | PRI 1-N |
| Cached data available | CACHE YES/NO |

Accordingly, a query may be characterized by multiple features. In some embodiments, the resource allocation system may prioritize a particular one of the one or more features as being determinative by itself to properly indicate the compute resource, or parameters of the computer resource, that are needed to perform the processing task. For example, the resource allocation system may be configured such that a query from a particular originator, or group, should always be processed by certain backend computer resource. In other embodiments, the resource allocation system uses a combination of two or more of the features to determine the compute resources that are needed to perform the processing task. For example, the resource allocation system may use the data size feature SIZE 3 to determine the power of the computer resource that is necessary for the processing, and then also use the user defined code feature UDC YES to determine certain controls that will be used on the computer resource processing the query, for example, to stop the computer resource after it has processed the query.

Historical Information

The resource allocation system may receive processing metadata from the back-end resource after the compute request has been performed, and store the processing metadata as historical information. In addition to the resource allocation system's knowledge of the existence of usable cached data (previously computed data), the resource allocation system may use the stored historical information to help determine fitness scores for the back-end computer resources available for a particular query, so that the fittest compute resource may be selected. In other words, the resource allocation system may identify query information and match it to query information that was previously received and historical information associated with the results of a backend computer resource processing the query. As the amount of historical information increases, the resource allocation system may better evaluate whether the processing done in response to a certain type of query (e.g., a query for a particular type of data set, from a particular group, on a particular data set, etc.) was performed by a computer resource that was sized correctly (e.g., included a sufficient amount of memory, CPU availability, CPU speed, number of CPUs, and the like). By evaluating query information contained in a new query with the historical information, the resource allocation system can then determine for the new query an appropriate computer resource to perform the desired processing.

Back-End Computer Lifecycle Management

The resource allocation system may also be configured to manage the back-end computer resources. For example, based on the number of queries it receives and the corresponding number of compute requests it generates, the resource allocation system may start or stop compute resources. In one example, when the resource allocation system receives a number of similar queries, the system may start a number of compute resources having similar computational capabilities (e.g., horizontally scaling the compute resources). In another embodiment, the system may dynamically add memory to an existing resource (e.g., vertical scaling). In another example, when the resource allocation system receives a number of dissimilar queries, the system may start a number of compute resources of varying computational capabilities (e.g., adaptive horizontal scaling, or vertical and horizontal scaling the compute resources). These scaling situations may be referred to as auto-scaling for ease of reference. Either of these situations may occur for example, during normal work hours for data analysts. In another example, the resource allocation system may have historical information that indicates a particular time of day, or particular days, where more or fewer back-end compute resources are required to process compute request resulting from incoming queries. For such times, or days, the resource allocation system may auto-scale the compute resources to match the expected workload. In some embodiments, the resource allocation system may monitor one or more of the existing compute resources and adjust the power of the compute resources if the monitoring determines more or less power is necessary. Adjusting the power of a compute resource may include, for example, increasing or decreasing a memory allocation, increasing or decreasing the number of CPUs that are dedicated on the compute resource, or changing any other parameter of the compute resource that affects its ability to process the compute request. In other embodiments, the resource allocation system may terminate running compute resources that are inactive or under-utilized, thus reducing operational costs.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types.

Property Value: The value associated with a property, which is of the type indicated in the property type associated with the property. A property may have multiple values.

Cleaning: As used herein, "cleaning" is a broad term that refers to changing information or a value, that is in data fields, to put the information or value in a proper (e.g., expected) condition for subsequent processing. For example, changing information that is in a data field to correct an error in the information, such as changing the information to be of an expected format, length, case, or contain certain alphanumeric characters or symbols. In one example, in a data field that contains (as the information) an email address an "@" symbol may be expected and if such a symbol is not present, the information in the data field can be changed to reflect a proper email address, or the information may be deleted. In another example, if only lowercase alphanumeric characters are expected in a data field, but in the data field are uppercase alphanumeric characters due to improper entry of the information, the information in the data field can be "cleaned" by changing the uppercase alphanumeric characters to lowercase alphanumeric characters. In another example, if the information in a data field is expected to be of a certain length (e.g., a certain number of alphanumeric characters) and more or less of the merit characters are found in the data field, the information may be changed to then reflect the correct number of alphanumeric characters, and thus be deemed "cleaned."

Preparing: As used herein, "preparing" is a broad term that refers to changing information or a value that is a data field to put the information or value in a desired condition for subsequent processing. In some cases, information in a data field may not be incorrect per se (for example, be of the wrong case, length, be misspelled, wrong alphanumeric character type, etc.) but a user may want to change the information in certain data fields to be more consistent, or normalize the data to use certain terminology, for example based on the subsequent use of the data. In one example, where users entered information relating to roadways, different terms such as "road," "highway," "drive," "street," "avenue," and the like may have been properly entered, but subsequently a user wants to designate all of such items information as a "road" for a certain application or use of the data, and thus the information may be "prepared" by selecting all the data fields with such terms as "road," "highway," "drive," "street," and "avenue" and setting all of the selected data fields to include the information "road." "preparing" and "cleaning" as used herein, may be used interchangeably as they both refer to changing information or values that is in data fields to prepare the information for additional or subsequent processing.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Examples of a Resource Allocation System

The user-driven process of preparing queries (e.g., filtering, transformations) for a data set may be referred to front-end processing. Conversely, processing of the large data set, or operations that are performed on the large data set may be referred to as "back-end processing." As an example, front-end processing is performed on a data subset (i.e., data set "preview") when a user is determining operations to clean and prepare the large data set for further processing or analysis; the determined operations are not executed immediately on the front-end, but deferred for backend-processing once the fully constructed query is submitted. As another example, back-end processing is performed when applying the operations described in the query during front-end processing to the complete data set.

FIG. 1 illustrates a schematic of an overview of an embodiment of a resource allocation system 110 that is part of a computing environment 100 (e.g., a datacenter) and certain associated components, for determining one or more scores associated with a query based at least in part on stored historical information, providing a compute request to the particular back and computer resource to perform a processing operation on a portion of one or more data sets, and storing processing information related to the processing of the compute request as historical information. As shown in FIG. 1, one or more front-end computer resources 103 provide a plurality of queries 120 as incoming queries to the resource allocation system 110. Data analyst working on the front and computer resources 103 may generate the queries 120. The resource allocation system 110 may receive the queries 120 via a communication network 105, which may be any type of network or communication channel capable of communicating information from the front-end computer resources 103 to the resource allocation system 110. Although not discussed in detail herein, the network 105 may also be used to provide information related to a completed processing task (e.g., as requested by query) from the resource allocation system 110 and/or a back-end computer resource 130-135 to the front-end computer resource 130 (and the data analyst) that generated the query. In some embodiments, the information provided back to the front-end computer resource 103 includes a link to a data set resulting from the query, the data set itself, or information that indicates where the resulting data set may be found, for example on a storage device 115 in communication with a resource allocation system 110.

The resource allocation system 110 includes various functionality, for example, for receiving the queries 120, determining scores for received queries, determining compute requests, based on the determined scores, to send to back-end computer resources 130-135 for processing, controlling the back-end computer resources 130-135, receiving processing data from the backend computer resources 130-135 and storing the processing data as historical information. For example, in the embodiment illustrated in FIG. 1, the resource allocation system 110 includes a first non-transitory computer storage medium 112 configured data received by two or more back end computer resources, the data including historical information related to processing of previously received queries by the two or more back-end computer resources 130-135. The resource allocation system 110 also includes a query scoring module 114, a compute request and backend computer resource control module 116, and a managed historical information module 118. The resource allocation system 1 110 also includes a second non-transitory computer storage medium 113 configured to at least store computer executable instructions, the computer executable instructions configuring the resource allocation system 110 to perform the functionality for the query scoring module 114, a compute request and backend computer resource control module 116, and a managed historical information module 118. In operation, once a query is received by the resource allocation system 110, the query scoring module 114 may evaluate information in the query ("query information") to determine a score for the query ("query score"). The query score may be based in part on the query information and stored historical information 112. Once a query score is determined, the compute request and control module 116 generate a compute request to send out to an available back-end computer resource 130-135. Additional information on the functionality of these modules 114, 116, 118 is illustrated in, and described in reference to, FIGS. 4, 5, 6, 7 and 9.

As illustrated in FIG. 1, the back-end computer resources 130-135 may be configured to have different processing power. The processing power may relate to, for example, the number of CPUs or type of CPU's allocated to the computer resource, an interface speed of the computer resource, the amount of RAM memory or other type of memory allocated to the computer resource, the amount of cache memory on one or more CPU's of the computer resource, the speed of one or more of the CPUs of the computer resource, and/or any other hardware, software or firmware characteristic or feature of a computer resource that affects its processing power. As an illustrated example, back-end computer resources 130, 131 are configured to have a certain level of processing power. Back-end computer resource 132 has a higher level of processing power than computer resources 130, 131 as indicated by the "+" sign. Back-end computer resource 133 has a higher level of processing power than computer resource 132 as indicated by the "++" and similarly, back-end computer resource 134 has a higher level of processing power than computer resource 133 as indicated by the "+++".

Figure 2:
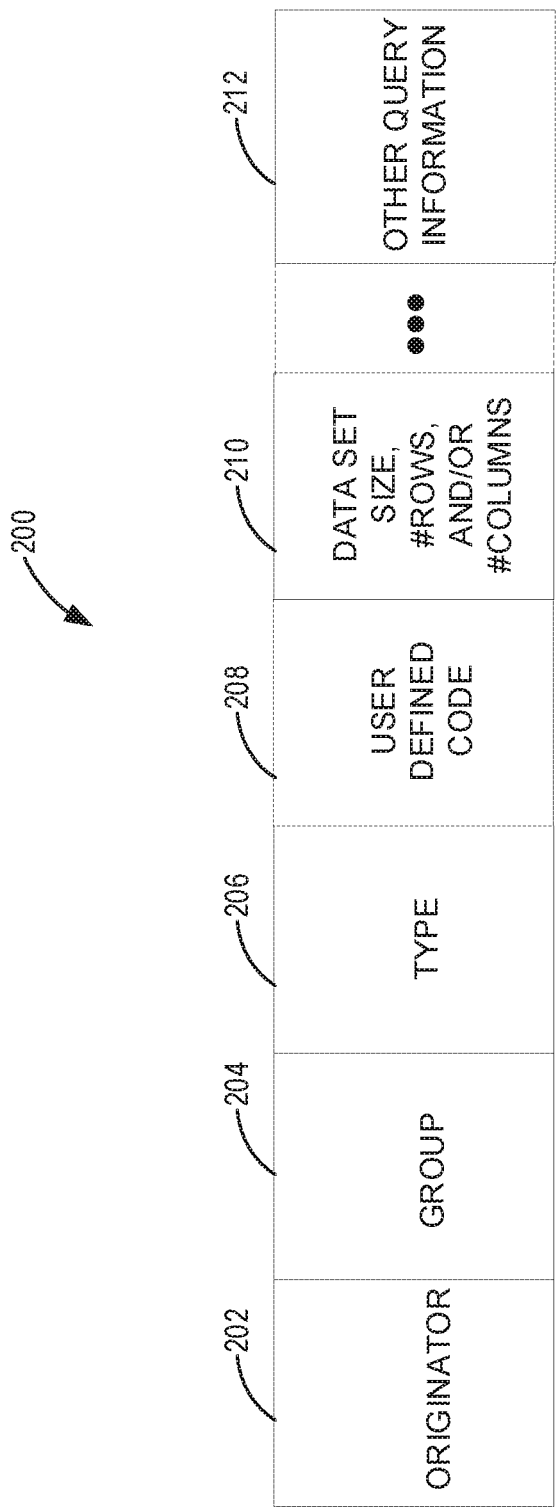
FIG. 2 illustrates an example of data that may be included in a query received by the system illustrated in FIG. 1.

FIG. 2 illustrates one example of query information that may be included in a query 200 received by the resource allocation system 110 illustrated in FIG. 1. In this example, the query 200 may include one or more of a query originator 202, a group originator 204, a query type 206, user defined code 208, information related to the data set that is to be processed 210, and/or other types of query information 212. In various embodiments, the query information may be in various formats, for example, data type of a Boolean (true or false), double (fractional numbers), integer (whole numbers), long (large whole numbers), date, or timestamps (instants in time), double (fractional numbers), integer (whole numbers), or long (large whole numbers), or any other data format that is readable by the resource allocation system 110.

The query originator 202 may include information that identifies the originator of the query, for example, a data analyst that generated the query. The group originator 204 may specifically indicate a group that the query originated from. For example, a number of data analyst may be part of a particular group that typically generates similar types of queries that may require similar computer resources to process.

The query type 206 may include information that indicates what type of processing is required for this query, the type relating to the processing involved or the extent of computing is that is necessary. For example, the query type 206 may indicate the operations to be performed are one or more filtering operations, transformations, and/or search-and-replace of information in the data set. In some embodiments, the query type 206 includes a value from a predetermined list that indicates a type of processing that is needed for this query.

The user defined code 208 may be custom written queries or other competition instructions provided by an analyst for a particular processing task. In some embodiments, any time a query 200 contains user defined code, the query scoring module 114 identifies that such user defined code exist and passes the information on to the compute request and control module 116. When a compute request is generated by the compute request and control module 116, the compute request may include lifecycle control information for the back-end computer resource that will process the compute request, the lifecycle information including instructions that are specifically defined to lower risk of performing such user defined code in a processing operation. These instructions may include, for example, a time limit for the processing to occur to mitigate against the user defined code creating an endless loop of processing. In another example, the instructions may include "kill" information to stop the back-end computer resource after it completes the compute request, mitigating against the user defined code affecting subsequent operations of the back-end computer resource. In another example the instructions may include "kill" information to stop the back-end computer resource if certain conditions occur, for example, if CPU time that is being used for processing exceeds a certain limit, if memory being used for the processing exceeds a certain limit, or if the back-end computer resource request additional resources (e.g., memory allocation), or if other unexpected processes are initiated by the back-end computer resource performing the processing with the user defined code.

The query 200 may also include a variety of other query information 212 that defines the requested processing task. In various embodiments, the other query information 212 may also be used during the query scoring process. In some embodiments, a score may be determined for one or more or each of the information that is in the query 200, and the final query score is determined based on these one or more scores. In some embodiments, the resource allocation system 110 uses a lookup table with predetermined information to match the information in the query 200 with an appropriate score.

FIG. 3 illustrates an example of different types of historical information 300 that may be stored in a resource allocation system 110, for example on computer medium 112 as illustrated in FIG. 1. In various embodiments, the stored historical information 300 may include one or more of the examples of information shown in FIG. 3, or may include additional information that is not illustrated in FIG. 3. Accordingly, in one embodiment the historical information may include one or more of a query ID 302, a compute request ID 304, and originator 306, a group 308, and a request type 310. The historical information may also include data set size 312, which comprises information relating to the one or more data sets that were processed in association with a particular compute request ID. A particular query may request processing of one or more data sets. The data set size 312 information may include, for at least one of the data sets processed, the number of rows in the data set, the number of columns in the data set, and/or the overall size of the data set. Other metrics may in included in the data set size 312 to provide an indication of the size of the data sets being processed.

The stored historical information 300 may also include one or more back-end compute resource parameters 314, which provide information on the computer resource used to process the compute request associated with compute request ID 304. The one or more back-end compute resource parameters 314 may include, for example, the amount of memory and the number of CPUs of the computer resource. The back-end compute resource parameters 314 may also include priority information indicative of the processing priority of this processing task, the type of CPUs in the computer resource (e.g., indicating the speed, cache, or other processing characteristics of the CPU's. In various embodiments, the back-end compute resource parameters 314 may also include one or more other parameters indicative of a parameter of the compute resource. The query scoring module 114 may generate a query score based in part on one or more of the stored historical information 300.

Figure 4:
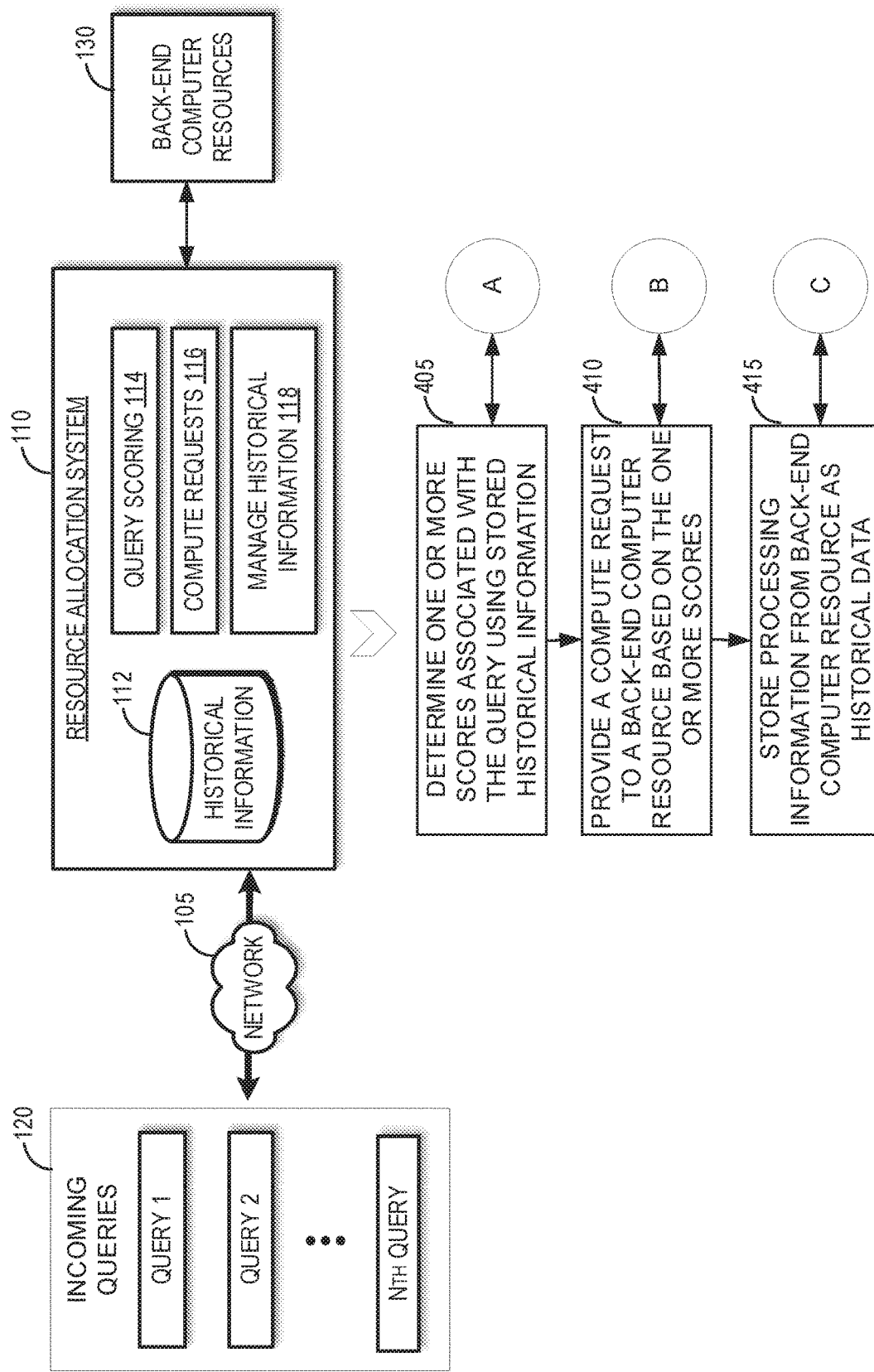
FIG. 4 illustrates a schematic that illustrates examples of processing that may be performed on a resource allocation system, the processing being illustrated in conjunction with the flow charts in FIGS. 5, 6, and 7.
Figure 5:
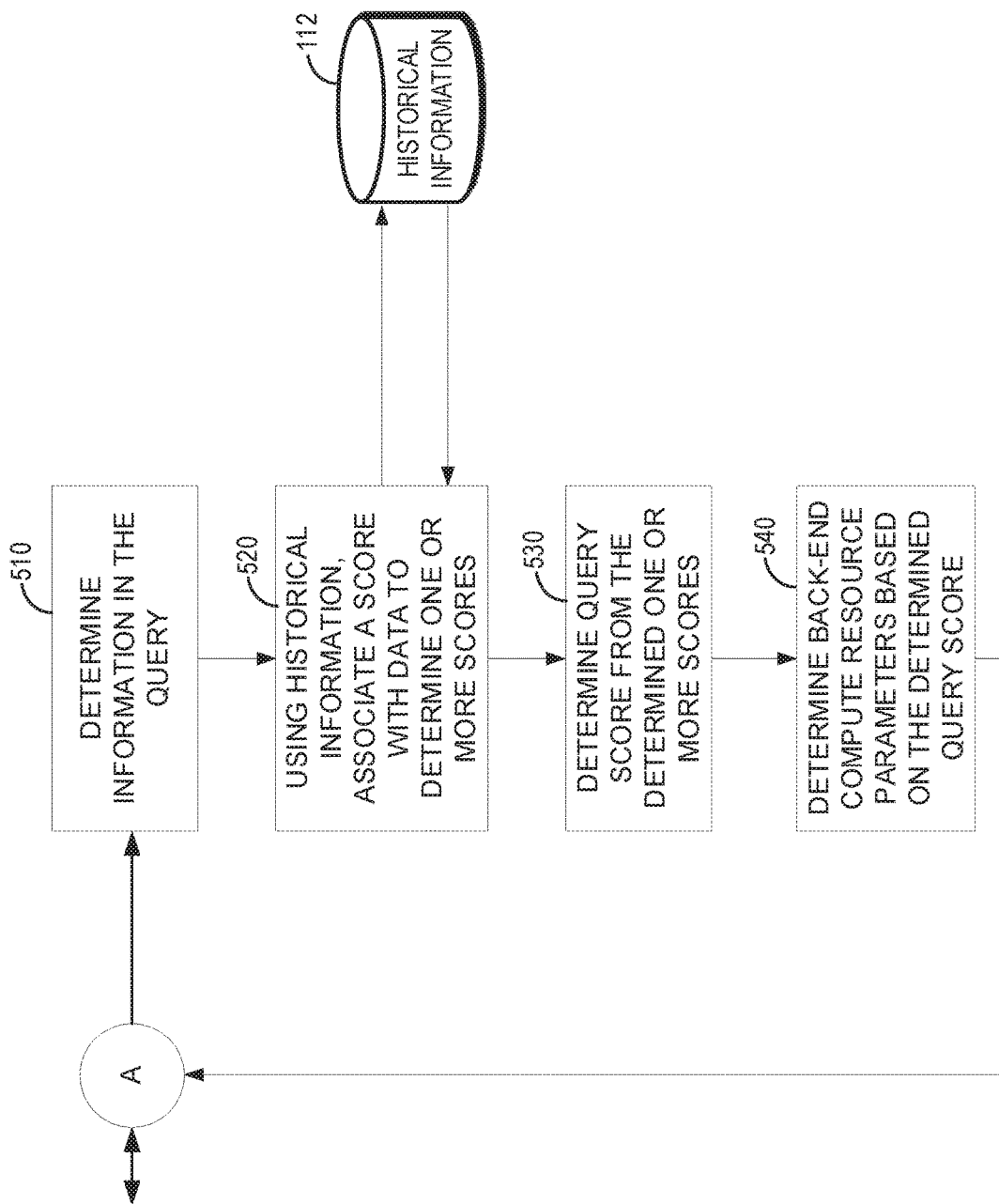
FIG. 5 is a schematic that includes a flowchart illustrating an embodiment for providing a computer request to a back-end computer resource based on the one or more scores.
Figure 6:
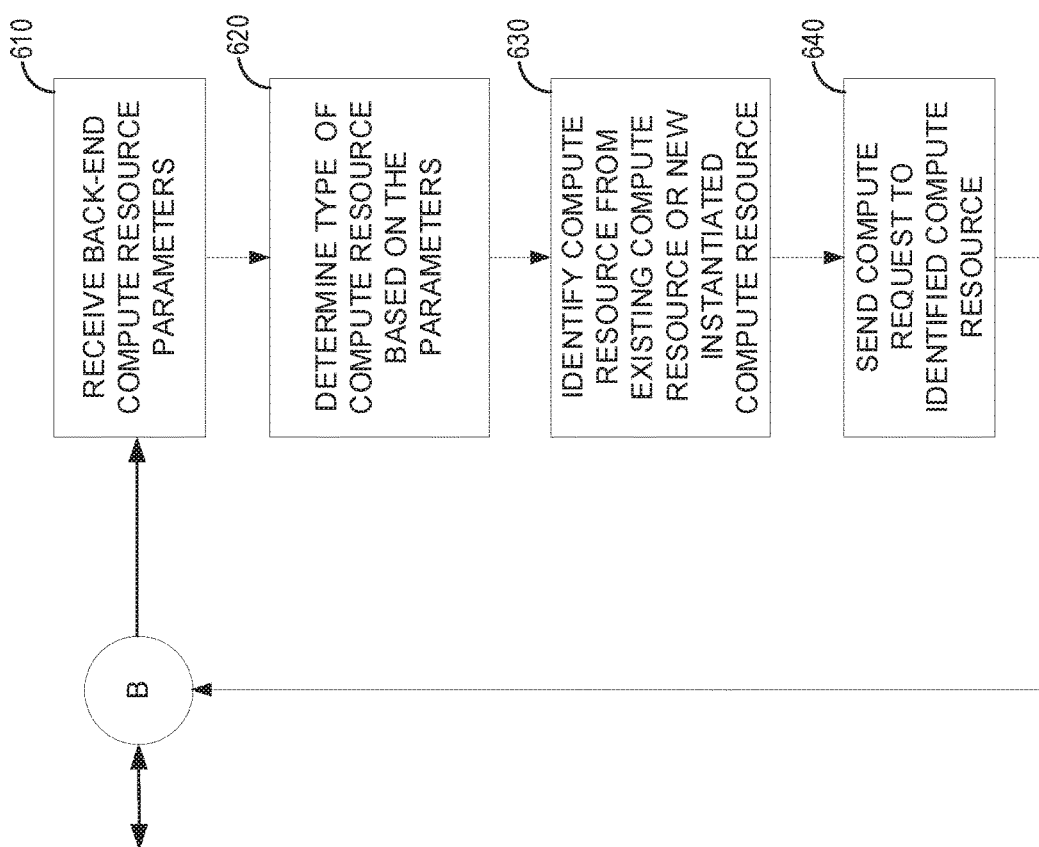
FIG. 6 is a schematic that includes a flowchart illustrating an embodiment for determining a compute request associated with a received query.
Figure 7:
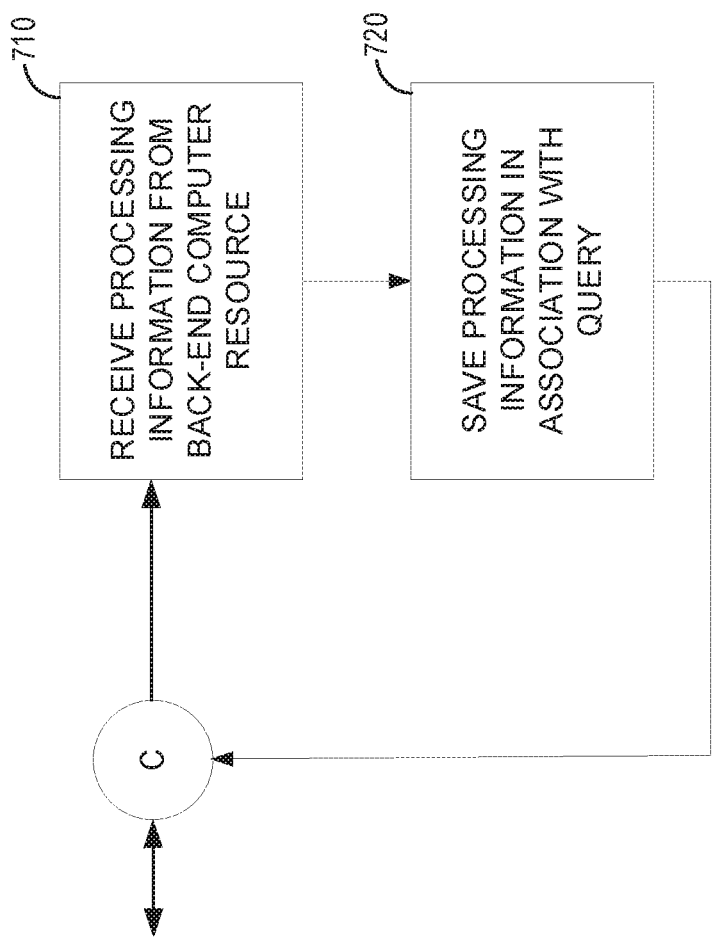
FIG. 7 is a schematic that includes a flowchart illustrating an embodiment for storing processing information that is received from a back-end computer resource, as historical information, such that the historical information can be used to help determine future compute request.

FIG. 4 illustrates a schematic that illustrates examples of processing that may be performed on an embodiment of a resource allocation system 110, the processing being illustrated in conjunction with the flow charts in FIGS. 5, 6, and 7. In FIG. 4, the circled "A" "B" and "C" are pointers to corresponding processes in FIGS. 5, 6, and 7. The resource allocation system 110 may be the same as illustrated in FIG. 1, although all the components illustrated in FIG. 1 may not be shown in the embodiment in FIG. 4.

When a query 120 is received over the network 105 by the resource allocation system 110, the resource allocation system 110 performs processing on the query 120, as illustrated in the flowchart in FIG. 4. For example, at block 405, the query scoring module 114 may process the query 120 to determine one or more scores associated with the query 120 using the query information (e.g., as illustrated in FIG. 2) and also using stored historical information (e.g., as illustrated in FIG. 3). An example of this processing is further described in reference to FIG. 5. At block 410, the compute request module 116 may provide a computer request to back-end computer resource 130, the compute request being based on the determined one or more scores in block 405. An example of this processing is further described in reference to FIG. 6. At block 415, the manage historical information module 118 may receive processing information from the back-end computer resource 130 that process the compute request, and stores at least a portion of the processing information as historical information in a database on a computer medium 112 of the resource allocation system 110. An example of this processing is further described in reference to FIG. 6. The amount of stored historical information increases as the number of queries that are processed increases. ACCORDINGLY, the stored historical information will include, over a period of time, and increased amount of historical information that may be relevant to any particular query.

FIG. 5 is a schematic that includes a flowchart illustrating an embodiment of a process that may be implemented in a resource allocation system 110 for determining one or more scores for a query and determining a back-end computer resource request to a back-end computer resource based on the one or more scores. At block 510, the resource allocation system 110 determines what type of information is in the query. In some cases, the presence of a type of information may generate a score for the query. For example, if the query includes user-defined code, a certain score may be determined for the query to indicate certain parameters required for the back-end computer resource that will perform the processing. In another example, each of the different pieces of the query information may be assigned a score such that more than one score is determined. In some instances, the query scoring module 114 tries to match (as best as possible) the query information to information historical, and a score may be assigned based on the historical information.

At block 530, a total query score can be determined from the more than one scores that may be assigned to a query. Depending on the specific implementation, the scores may be differently weighted, or may be equal in weight. At block 540, the resource allocation system 110 determines back-end compute resource parameters based on the determined query score. For example, the resource allocation system 110 may include a lookup table, or another form of stored predetermined data, that is used to associate a determined query score with parameters for the backend computer resource. In another example, the resource allocation system 110 may include a set of conditions that associates a determined query score with parameters for the backend computer resource.

FIG. 6 is a schematic that includes a flowchart illustrating an embodiment for determining a compute request associated with a received query. In some embodiments, the process illustrated in FIG. 6 may be performed by the compute request module 116 of the resource allocation system 110. In block 610 of FIG. 6, the resource allocation system 110 receives backend compute resource parameters that were determined based on a query score. At block 620, the process generates a compute request based on the received parameters. The parameters may include information relating to one or more of CPUs, memory, processor speed, number of computer resources needed for the processing task, if the processing task has a hard end time, particular risk mitigation required for the computer resource (e.g., if user-defined code will be run), or other parameters relating to a computer resource.

At block 630 the resource allocation system 110 identifies a computer resource from one of the existing compute resources, or determines to start a new computer resource to perform the processing task. In various embodiments, the identified computer resource may be a physical system or virtual system. Finally at block 640, the resource allocation system 110 sends the compute request to the identified computer resource to start the processing task.

FIG. 7 is a schematic that includes a flowchart illustrating an embodiment for storing processing information that is received from a back-end computer resource, as historical information, such that the historical information can be used to help determine future compute request. After the back-end computer resource completes the processing as requested by the compute request, in addition to providing a resulting data set, a link to the resulting data set, or an indication with the resulting data set can be found, the computer resource provides processing information to the resource allocation system 110. At block 710, the resource allocation system 110 receives the processing information from the back-end computer resource for a particular compute request. In various embodiments, the processing information may include any information characterizing the processing that was performed by the computer resource (e.g., run time, number of computations, memory used, CPU time used, size of the data set processed, and the like). At block 720, the resource allocation system saves a portion or all of the processing information as historical data, for example, on the first computer medium 112 of the resource allocation system. As described above, the stored historical information may be subsequently used by the resource allocation system to help determine the proper computer resource required for new queries.

Figure 8:
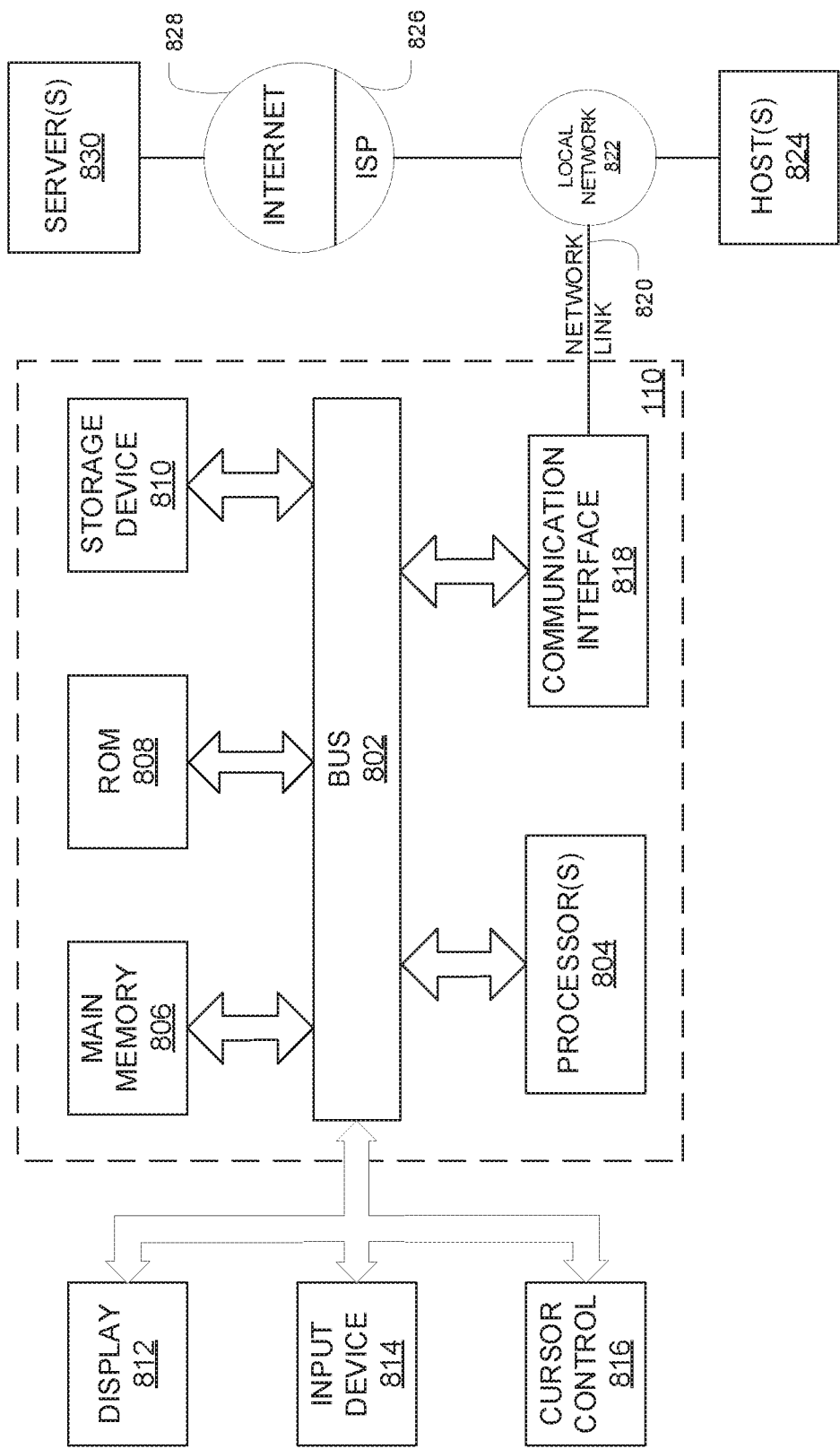
FIG. 8 is a block diagram that illustrates a computer system with which certain methods discussed herein may be implemented.

FIG. 8 is a block diagram that illustrates a computer system 800 with which certain methods discussed herein may be implemented. That is, in various examples, the data preparing system 110 may be implemented as computer system 800. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The main memory 806 may, for example, include instructions to implement a user interface as illustrated in FIG. 6, calculate data metrics, allow a user to filter data and change data in data sets, and store information indicting the operations performed to clean and/or prepare data to a log as described in FIGS. 1 and 6-10, the data being stored in some examples in data objects as defined by an ontology, as described in reference to FIGS. 2-4.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Accordingly, in some embodiments, of the computer system 800, the computer system comprises a first non-transitory computer storage medium storage device 810 configured to at least access a first data set representable in a tabular rows and columns format, cause presentation of a data subset on a display device, the data subset being a portion of the first data set, the presentation of the data subset including a plurality of columns of data, each of the columns of data having data fields including data field information, receive user input identifying a column of the data subset, determine data field information to modify for at least some of the data fields of the identified column, generate and cause display of an indication of a proposed change action to modify the determined data field information, and in response to a user input indicating a selection of the indication of the proposed change action, cause update of the presentation of the data subset based on the change action to modify data field information in data fields of the identified column of the data subset and store a log of each change action.

Figure 9:
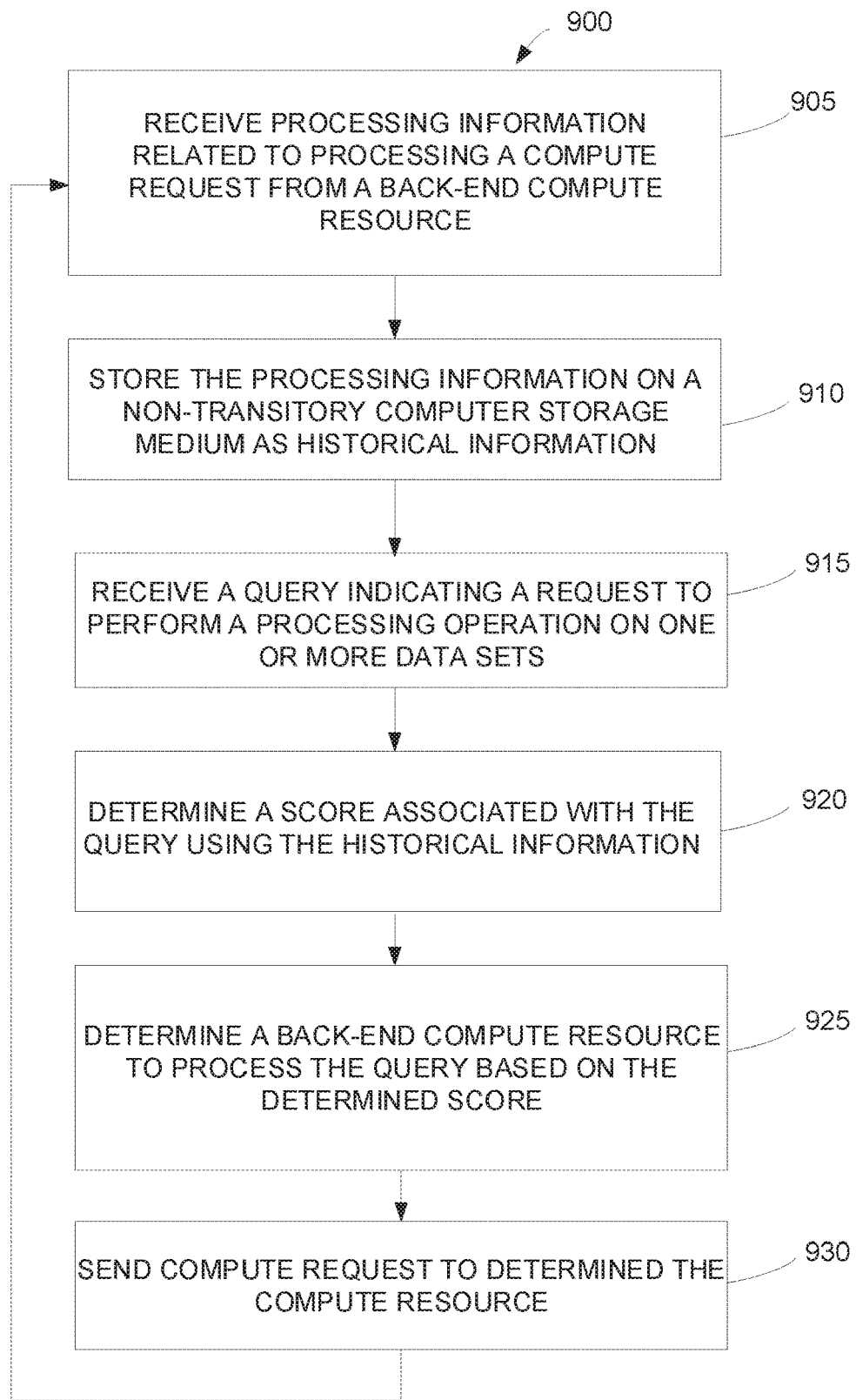
FIG. 9 is a flowchart illustrating an example process for allocating back-end computer resources.

FIG. 9 is a flowchart illustrating an example process 900 for allocating back-end computer resources. In various embodiments, process 900 may be implemented on a resource allocation system 110 illustrated in FIG. 1 and in FIG. 8.

At block 905, process 900 receives processing information, related to completion of a processing task as defined by a compute request, from a back-end compute resource. At block 910, process 900 stores at least a portion of the processing information on a non-transitory computer storage medium as historical information. At block 915, the process 900 receives a query indicating a request to perform a processing operation on one or more data sets. At block 920, process 900 determines a query score associated with query, and the score may be determined using the stored historical information. The query score may be based on one or more scores determined from information in the query. At block 925, the process 900 determines a back-end compute resource to process the query based on the determined score. As described above, the query score may indicate one or more certain parameters for the back-end compute resource. Accordingly, at block 925, the process 900 may use one or more of the parameters to determine the backend compute resource to use for the processing task defined in the query. At block 930, process 900 sends the compute request to the determined compute resource. Subsequently, once the compute resource has completed the processing involved with the compute request, process 900 proceeds to block 905 and the reallocation system 110 receives processing information for the completed compute request.

Figure 10:
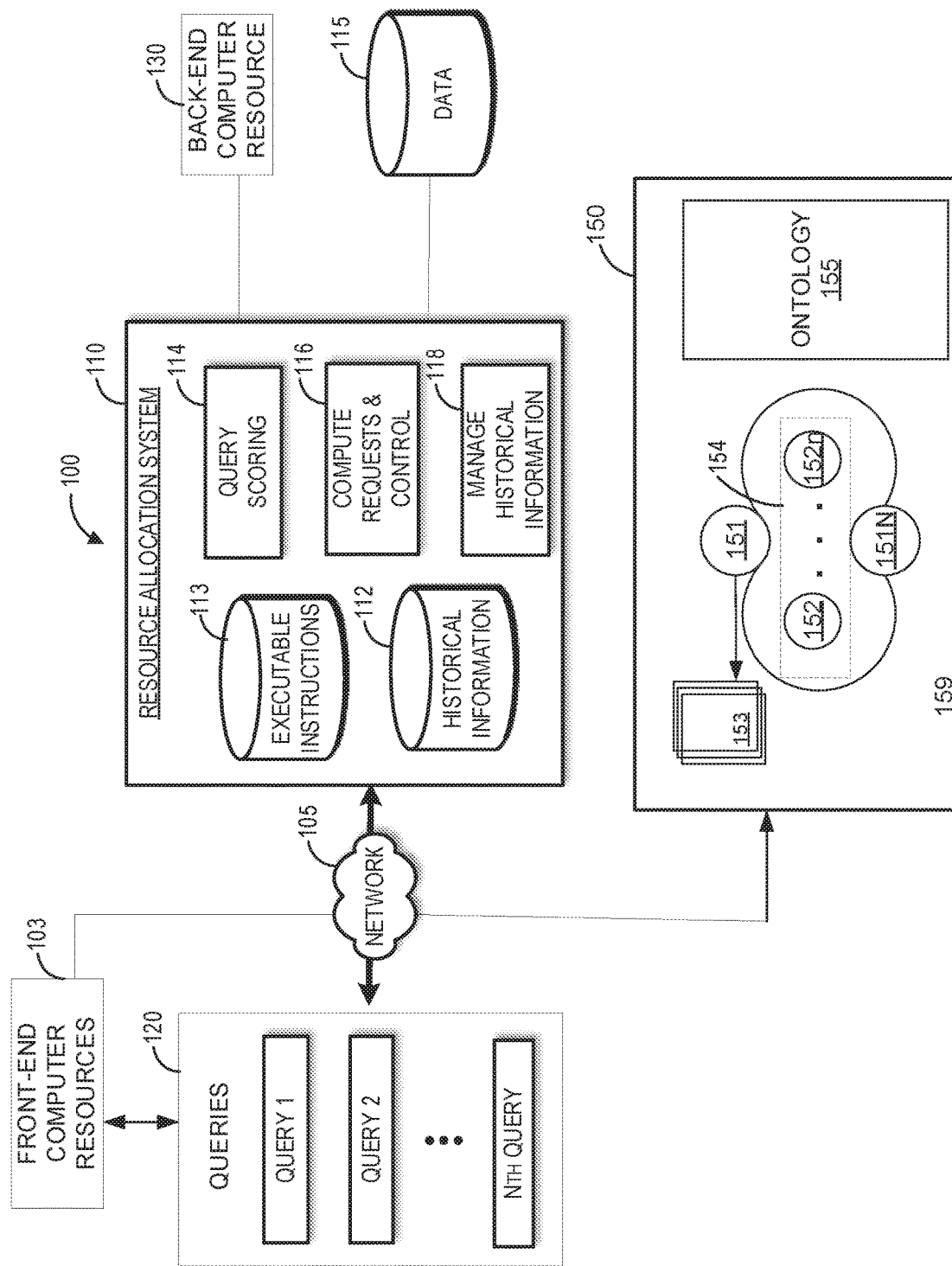
FIG. 10 illustrates one specific example of an embodiment of a resource allocation system 110 where the queries 120 are generated for large complex data sets that are based on an ontology

FIG. 10 illustrates one specific example of an embodiment of a resource allocation system 110 where the queries 120 are generated for large complex data sets that are based on an ontology. In some examples, the data sets can then be provided via network 150 from an ontology-based database system 159 where the information in the data set can be stored in an ontology-based database 159 for further processing by a data analyst. In this example, the front and computer resource 103 may be tasked to perform data cleanup, data transformation, and/or data filtering of one or more data sets that are linked by an ontology. In this example, analysts working on the front and computer resources 103 access various data sets through the network 105, determines the processing that needs to be performed on various data sets and defines the processing task in the queries 120, which are provided to the resource allocation system over the network 105. In some examples of data processing, using data sets linked to other data sets by an ontology may affect the computer resources necessary to perform the processing defined in the query.

In some embodiments, a body of data is conceptually structured according to an object-centric data model represented by ontology 155. The conceptual data model is independent of any particular database used for durably storing one or more database(s) 159 based on the ontology 155. For example, each object of the conceptual data model may correspond to one or more rows in a relational database or an entry in Lightweight Directory Access Protocol (LDAP) database, or any combination of one or more databases. An ontology 155 may include stored information providing a data model for storage of data in the database 4. The ontology 155 may be defined by one or more object types, which may each be associated with one or more property types. At the highest level of abstraction, data object 151 is a container for information representing things in the world. For example, data object 151 can represent an entity such as a person, a place, an organization, a market instrument, or other noun. Data object 151 can represent an event that happens at a point in time or for a duration. Data object 151 can represent a document or other unstructured data source such as an e-mail message, a news report, or a written paper or article. Each data object 151 is associated with a unique identifier that uniquely identifies the data object within the database system.

Different types of data objects may have different property types. Each property 153 as represented by data in the database system 150 may have a property type defined by the ontology 155 used by the database 159. Objects may be instantiated in the database 159 in accordance with the corresponding object definition for the particular object in the ontology 155. Each link 152 represents a connection between two data objects 151. In one embodiment, the connection is either through a relationship, an event, or through matching properties. A relationship connection may be asymmetrical or symmetrical. In one embodiment, when two data objects are connected by an event, they may also be connected by relationships, in which each data object has a specific relationship to the event. Each data object 151 can have multiple links with another data object 151 to form a link set 154. Each link 152 as represented by data in a database may have a link type defined by the database ontology used by the database.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.). Using a data preparing and cleaning system prior to importing data into an ontology-based database system provides the advantages of the dynamic ontology with the assurance that the data input is consistent, has no or minimal errors, and/or has been pre-processed in accordance with certain data analysis criteria to place the input data in better condition for further analysis.

While using an ontological data model, as described above, may increase data analysis efficiencies in some aspects, processing such linked data sets can require increased computer resources, for example, more memory, more CPUs, etc. Accordingly, a query may include information indicating the number of data sets involved in the processing task in the size of the data sets (see for example, Table 1). In addition, processing information received by a resource allocation station from a back-end computer resource after it has completed the compute request associated with the query may be saved as historical information, and then used as a reference for computer resources that may be necessary. For example, when the resource allocation station receives subsequent queries that indicate multiple data sets are involved in the processing, the historical information may be referenced to help determine the type or configuration of a computer resource that has been previously used for similar processing and if that type or configuration was sufficient to efficiently and successfully perform the requested processing.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA)

instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
one or more computer processors configured to execute computer-executable instructions to cause the system to at least:
receive, via a user input, a query indicating a request to perform a processing operation on a portion of one or more data sets;
determine that the query includes user defined code for running by a back-end computer resource, the user defined code including a custom script to perform specific operations;
determine one or more scores associated with the query, including at least:
a first score based at least in part on the query including the user defined code, wherein the first score indicates a level of risk of executing the user defined code; and
a second score based at least in part on a scope of the processing operation including one or more of a type of processing being performed or a size of the one or more data sets being processed;
in response to determining that the query includes user defined code, filter a set of back-end resources to exclude back-end resources not configured to execute the user defined code;
determine, based on the received query, the determined one or more scores, and historical information of prior processing outcomes, a back-end resource of the filtered set of back-end resources to execute the query;
determine a stop parameter based on the user defined code, the stop parameter indicating one or more of a run-time limit, a memory usage limit, or a post-processing action configured to stop the determined back-end computer resource;
generate a compute request including the query and the stop parameter; and
provide the compute request to the determined back-end computer resource.

2. The system of claim 1, wherein the back-end computer resource that receives the query is indicated by a highest score of the one or more scores associated with the query.

3. The system of claim 1, wherein at least one of the scores is based on an originator of the query.

4. The system of claim 3, wherein the originator is associated with a predefined group of a number of groups that the query may be associated with.

5. The system of claim 1, wherein the historical information includes processing time.

6. The system of claim 1, wherein the historical information includes size of the data set.

7. The system of claim 1, wherein the historical information includes characteristics of the back-end computer resource.

8. The system of claim 1, wherein the historical information includes query originator data.

9. The system of claim 1, wherein the historical information includes data set information corresponding to a particular data set processed by the back-end computer resource.

10. The system of claim 1, wherein the one or more computer processors are further configured to execute the computer-executable instructions to at least receive processing information from two or more back-end computer resources and save the processing information as historical information.

11. The system of claim 1, wherein the one or more computer processors are further configured to execute the computer-executable instructions to control a lifecycle parameter of the back-end computer resource.

12. The system of claim 11, wherein controlling a lifecycle parameter comprises setting a start parameter of the back-end computer resource.

13. The system of claim 11, wherein controlling a lifecycle parameter comprises controlling a start of a back-end computer resource with similar compute parameters.

14. The system of claim 1, wherein the one or more computer processors are further configured to execute computer-executable instructions to start the back-end computer resource to process the compute request for a query with user defined code and stop the determined back-end computer resource when the compute request is completed.

15. The system of claim 1, wherein the user defined code is not selectable from a user interface.

16. The system of claim 1, wherein the level of risk indicates a risk of causing a divide by zero operation or an incomplete processing flow, and the instructions further cause the system to:
trim the query by replacing a portion of the query with previously computed data associated with previous execution of the portion of the query.

17. The system of claim 1, wherein the instructions further cause the system to:
dynamically adjust one or more scores in real-time based on current health status of the back-end resources.

18. A method of resource allocation, comprising:
receiving, via a user input, a query indicating a request to perform a processing operation on a portion of one or more data sets;
determining that the query includes user defined code for running by a back-end computer resource, the user defined code including a custom script to perform specific operations;
determining one or more scores associated with the query, including at least:
a first score based at least in part on the query including the user defined code, wherein the first score indicates a level of risk of executing the user defined code; and
a second score based at least in part on a scope of the processing operation including one or more of a type of processing being performed or a size of the one or more data sets being processed;
in response to determining that the query includes user defined code, filtering a set of back-end resources to exclude back-end resources not configured to execute the user defined code;
determining, based on the received query, the determined one or more scores, and historical information of prior processing outcomes from previous queries, a back-end resource of the filtered set of back-end resources to execute the query;
determining a stop parameter based on the user defined code, the stop parameter indicating one or more of a run-time limit, a memory usage limit, or a post-processing action configured to stop the determined back-end computer resource;
generating a compute request including the query and the stop parameter; and
providing the compute request to the determined back-end resource;
wherein the method is performed by one or more computer hardware processors configured to execute computer-executable instructions stored on a non-transitory computer storage medium.

19. The method of claim 18, further comprising starting the back-end resource for a query with user defined code, and stopping the back-end resource when the compute request is completed.

20. The method of claim 18, further comprising:
starting the back-end computer resource;
providing a compute request to the back-end resource; and
stopping the determined backend resource based on the stop parameter.

21. The method of claim 18, wherein the user defined code is not selectable from a user interface.

* * * * *